United States Patent [19]

Hosoya

[11] 4,308,552
[45] Dec. 29, 1981

[54] COLOR TELEVISION RECEIVER

[75] Inventor: Nobukazu Hosoya, Nara, Japan

[73] Assignee: Sanyo Electric Co., Ltd., Osaka, Japan

[21] Appl. No.: 134,417

[22] Filed: Mar. 27, 1980

[30] Foreign Application Priority Data

Apr. 5, 1979 [JP] Japan .................................. 54-41754

[51] Int. Cl.³ .......................................... H04N 9/535
[52] U.S. Cl. .................................... 358/39; 358/21 R
[58] Field of Search ............................ 358/21, 39, 40

[56] References Cited

U.S. PATENT DOCUMENTS

| | | | |
|---|---|---|---|
| 3,582,540 | 6/1971 | Adler | 358/39 |
| 3,600,514 | 8/1971 | Poppy | 358/39 |
| 3,644,749 | 2/1972 | Wilcox | 358/39 |
| 4,212,029 | 7/1980 | Murakami et al. | 358/21 |

*Primary Examiner*—Richard Murray

*Attorney, Agent, or Firm*—Armstrong, Nikaido, Marmelstein & Kubovcik

[57] ABSTRACT

A video signal obtained through detection by a video intermediate frequency circuit is applied to a luminance signal circuit and a chrominance signal circuit. The luminance signal circuit comprises a luminance signal amplifier which does not include a delay line. A delay characteristic of a tuner and/or the video intermediate frequency circuit is selected a delay characteristic on the part of a transmitter, to offset a delay time difference between the luminance signal circuit and the chrominance signal circuit, whereby a delay line can be omitted in the luminance signal circuit, as described previously. Preferably, a surface acoustic wave device is provided in the tuner and/or the video intermediate frequency circuit, so that a group delay characteristic of the surface acoustic wave device and the delay characteristic on the part of the transmitter can offset the delay time difference between the luminance signal and the chrominance signal without employing a delay line in the luminance signal circuit.

6 Claims, 22 Drawing Figures

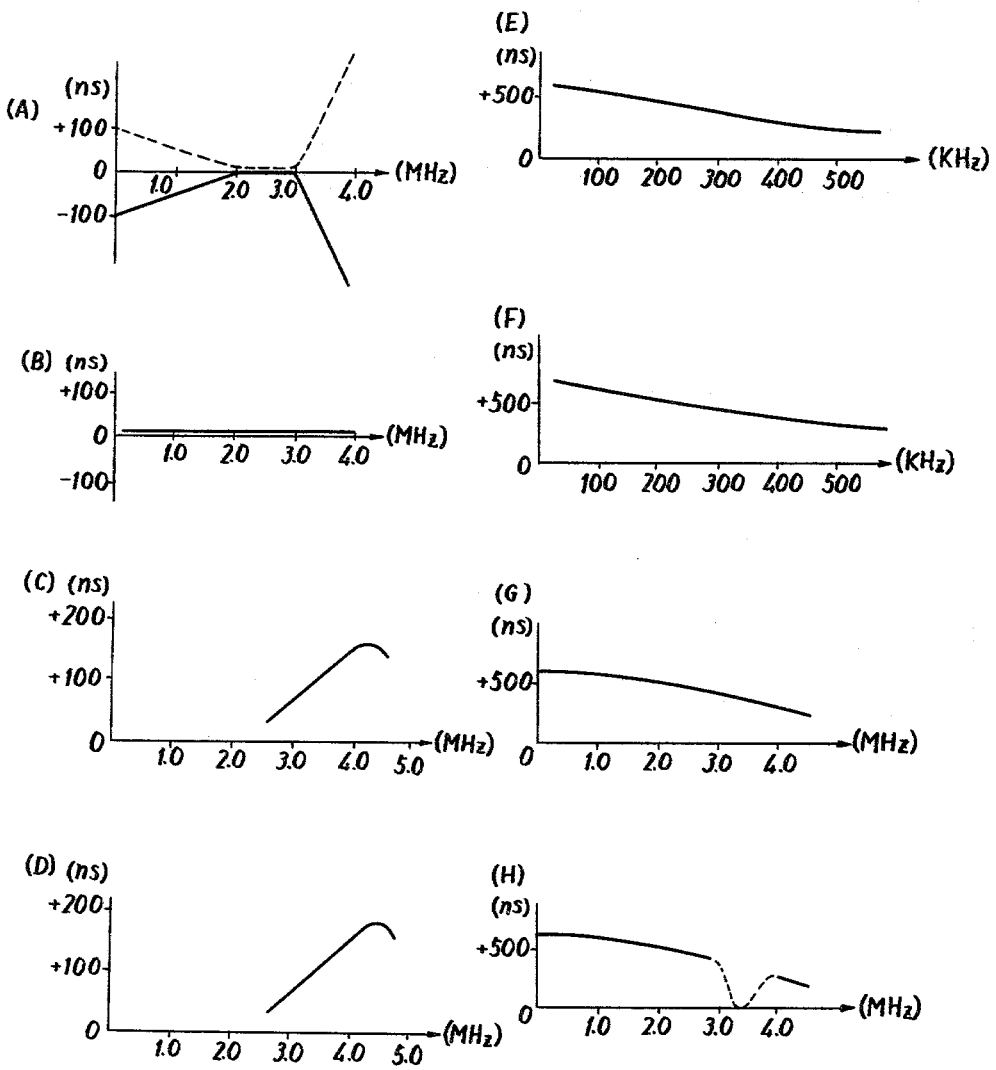

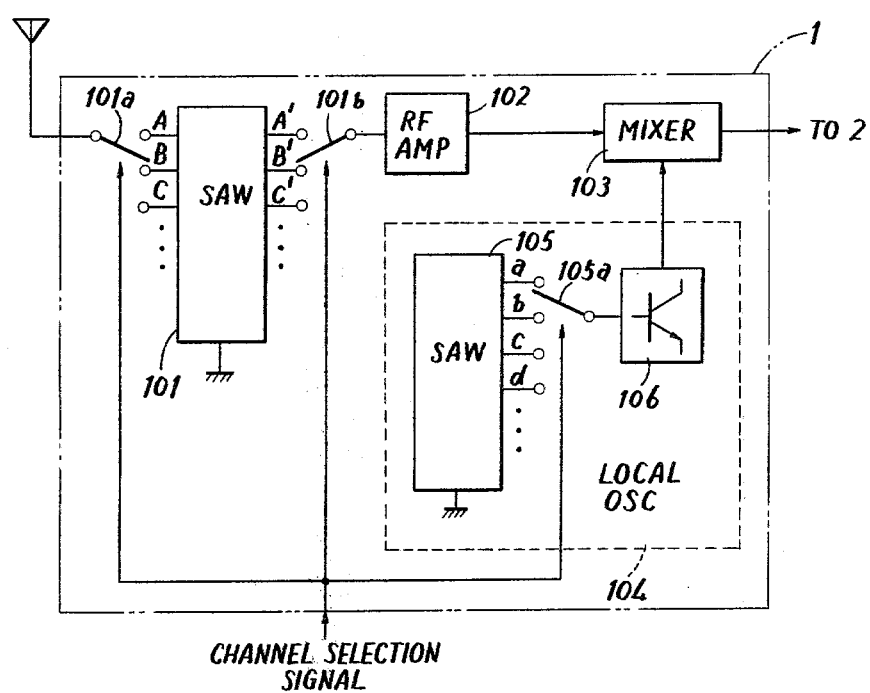

COLOR TELEVISION RECEIVER

BACKGROUND OF THE INVENTION

1. Field of the Invention

The present invention relates to a color television receiver. More specifically, the present invention relates to a novel television receiver wherein the phases of a luminance signal and a chrominance signal are made consistent with each other without employing a delay line for a luminance signal in a video signal processing circuit.

2. Description of the Prior Art

FIG. 1 is a block diagram showing the outline of a video signal processing circuit in a conventional color television receiver wherein the present invention can be advantageously employed. Referring to FIG. 1, a color television signal obtained from a transmitter end, not shown, is applied to a tuner 1 through an antenna. A tuning stage is selectively established to a desired broadcasting signal in the tuner 1, whereby the desired broadcasting signal is converted into a video intermediate frequency signal. The video intermediate frequency signal obtained from the tuner 1 is applied to a video intermediate frequency circuit 2. Although not shown, the video intermediate frequency circuit 2 comprises a video intermediate frequency amplifier, a video detector and the like and the output therefrom is withdrawn as a video signal. The video signal obtained from the video intermediate frequency circuit 2 is applied to a video buffer amplifier 3 constituted by an impedance converting means such as an emitter follower. The video signal obtained from the video buffer amplifier 3 is applied to a luminance signal circuit 4 and a chrominance signal circuit 7. The luminance signal circuit 4 comprises a delay line 5 for delaying the luminance signal separated from the video signal by a predetermined delay time and a luminance signal amplifier 6. On the other hand, the chrominance signal circuit 7 comprises a bandpass filter 8 for extracting a chrominance signal component from the video signal, so that the chrominance signal extracted by the bandpass filter 8 is applied to a chrominance signal processing circuit 9. The chrominance signal processing circuit 9 comprises a bandpass amplifier, a chroma synchronization circuit and the like and the output from the chrominance signal processing circuit 9 is applied to a color demodulator 10. The color demodulator 10 comprises a double balance demodulating circuit and the like, so that three color difference signals are obtained based on the given chrominance signal. The luminance signal obtained from the luminance signal amplifier 6 and the color difference signals obtained from the color demodulator 10 are applied to a matrix circuit 11. The matrix circuit 11 is responsive to the given luminance signal and the color difference signals to provide three color primary signals, which are applied to a cathode ray tube. Since the above described structure of a conventional color television receiver is well-known to those skilled in the art, a more detailed description thereof will be omitted. However, it is pointed out that a point of interest to the present invention is that the delay line 5 is inserted in the luminance signal circuit 4. The present invention is directed to an improvement in a video signal processing circuit for enabling omission of such delay line 5. Therefore, delay characteristics at various portion of the FIG. 1 diagram will be described with reference to the associated figures.

FIG. 2 shows graphs showing signal delay characteristics at various portions of the FIG. 1 diagram. The solid line in the graph (A) in FIG. 2 shows a delay characteristic of a transmitter end. The delay characteristic of such transmitter end is determined in advance as a standard system so as to be adaptable to an average delay characteristic of possible typical color television receivers. On the other hand, receivers are adapted such that the delay characteristic at the transmitter end is compensated by a delay characteristic involved in the circuit portion from the tuner 1 to the video buffer amplifier 3 of the receiver. To that end, the total phase characteristic from the tuner 1 to the video intermediate frequency circuit 2 is selected to exhibit a delay characteristic as shown by the dotted line in (A) in FIG. 2. Accordingly, the delay characteristic at the output terminal of the video buffer amplifier 3 becomes substantially flat with respect to the frequency, as shown as (B) in FIG. 2.

On the other hand, the frequency/amplitude characteristic in the chrominance signal frequency band in the video buffer amplifier 3 is somewhat asymmetrical with respect to the color subcarrier frequency 3.58 MHz as shown as (A) in FIG. 3. Therefore, the frequency/amplitude characteristic of the bandpass filter 8 included in the chrominance signal circuit 7 is selected to attain a normal frequency/amplitude characteristic as shown as (C) in FIG. 3 by correcting the frequency/amplitude characteristic shown as (A) in FIG. 3. Therefore, the resonance point or the central frequency ($f_0$) of the bandpass filter 8 is set to be considerably higher than the color subcarrier frequency (3.58 MHz). Accordingly, the delay characteristic in the chrominance signal frequency band in the bandpass filter 8 is not flat with respect to the frequency as shown as (C) in FIG. 2.

Thus, the delay characteristic of the bandpass filter 8 is as shown as (C) in FIG. 2 while the overall delay characteristic from the transmitter end up to the video buffer amplifier 3 is as shown as (B) in FIG. 2 and therefore the delay characteristic at the output end of the bandpass filter 8 becomes ultimately as shown as (D) in FIG. 2. The fact that the delay characteristic is inclined in the chrominance signal frequency band causes the amplitudes and the phases of both side bands of the chrominance signal to be different, which causes color distortion on the occasion of demodulation by the color demodulator 10. In case of such delay characteristic, it follows that the chrominance signal transferred through the chrominance signal circuit 7 is delayed in time as compared with the luminance signal transferred through the luminance signal circuit 4.

The color demodulator 10 comprises a double balance demodulator 10 as shown in FIG. 4, for example. A load resistor R1 of the double balance demodulator 10a is selected to be approximately 10kΩ and the load resistor R1 is shunted by a highpassing capacitor C1 of say 5 to 15 pF. The load resistor R1 may be considered as also shunted by a stray capacitance Cs of say 10 pF. A low pass filter 10b comprising an RC circuit is connected to the output signal circuit of the double balance demodulator 10a. A low pass filter stage is constituted by the load resistor R1, the highpassing capacitor C1, the stray capacitance Cs and the low pass filter 10b for removing a color subcarrier wave component of 3.58 MHz included in the chrominance signal. Therefore, the demodulated output at the color demodulator 10, i.e. the color difference signals are also subjected to time distortion at the low pass filter stage. More specifically, the delay characteristic at the low pass filter stage of the color demodulator 10 is as shown as (E) in FIG. 2. Therefore, the total delay characteristic from the transmitter end up to the low pass filter stage becomes ultimately as shown as (F) in FIG. 2. Meanwhile, it is pointed out that the characteristics shown as (E) and (F) in FIG. 2 show delay characteristics at the frequency band (0 to 500 kHZ) after color demodulation. As seen from the characteristics shown as (F) and (B) in FIG. 2, even if the luminance signal and the color difference signals as such are applied to the matrix circuit 11, the phases of the color difference signals and the luminance signal do not coincide with each other. As a result, it follows that proper color synthesization cannot be attained in the matrix circuit 11.

Therefore, conventionally a delay line 5 was necessarily inserted between the video buffer amplifier 3 and the luminance signal amplifier 6. By selecting the delay characteristic of such delay line 5 as shown as (G) in FIG. 2, the delay characteristic at the output terminal of the luminance signal amplifier 6 becomes as shown as (H) in FIG. 2. As a result, the phase of the luminance signal transferred through the luminance signal circuit 4 and the phase of the chrominance signal transferred through the chrominance signal circuit 7 come to coincide with each other, whereby proper color synthesization can be attained in the matrix circuit 11.

Meanwhile, the reason why a portion of the delay characteristic is shown by the dotted line as (H) in FIG. 2 will be described in the following. More specifically, although not shown, the luminance signal circuit 4 is provided with a trap circuit or a filter for removing the color subcarrier component at the stage before the luminance signal amplifier 6, for example. Such trap circuit is aimed to remove the so-called dot interference. Therefore, a component corresponding to the color subcarrier frequency is trapped by the trap circuit or the filter and accordingly the characteristic of the luminance signal is partially degraded accordingly.

For the above described reasons, conventional color television receivers necessarily employed a delay line in the luminance signal circuit. Furthermore, since the delay characteristic at the low pass filter stage included in the color demodulator 10 is not flat with respect to the frequency, as shown as (E) in FIG. 2, a disadvantage was encountered that although the phases of the color difference signals and the luminance signal approximately coincide with each other at a lower frequency region such as 0 to 200 kHZ both do not coincide with each other in a higher frequency region such as 200 to 500 kHz.

SUMMARY OF THE INVENTION

The present invention eliminates necessity of a delay line which was required in a luminance signal circuit in a conventional color television receiver. To that end, the overall delay characteristic from a transmitter end up to a providing point of a chrominance signal in a receiver is selected to be a delay characteristic for substantially offsetting a delay time difference between the luminance signal circuit subsequent to the providing point of the chrominance signal and a chrominance signal circuit (or conversely for slightly advancing the chrominance signal with respect to the luminance signal).

According to the present invention, a delay line necessarily required in a luminance signal circuit in a conventional color television receiver can be dispensed with and accordingly a structure of the receiver can be simplified as compared with a conventional receiver. As a result, a manufacturing cost of color television receivers can be reduced.

In a preferred embodiment of the present invention, a surface acoustic wave device is employed as a tuning or selecting element in a tuner and/or a video intermediate frequency circuit. Since a surface acoustic wave device makes it possible to design separately the frequency/amplitude characteristic and the delay characteristic (the group delay characteristic), a surface acoustic wave device can be effectively and advantageously employed for the purpose of the present invention.

In a further preferred embodiment of the present invention, it is adapted such that the delay characteristic of a low pass filter stage included in a color demodulator is made substantially flat with respect to the frequency. According to the embodiment, any color distortion which occurred conventionally due to the fact that the delay characteristic at the low pass filter stage is not flat can be eliminated and accordingly the picture quality is much enhanced.

Accordingly, a principal object of the present invention is to provide a color television receiver having a video signal circuit of a simple structure.

Another object of the present invention is to provide a color television receiver which eliminates necessity of a delay line at a luminance signal circuit subsequent to a point where a video signal is divided into a luminance signal and a chrominance signal.

A further object of the present invention is to provide a color television receiver of an improved picture quality.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 shows graphs of delay characteristic at various portions in the FIG. 1 diagram;

FIG. 9 is a block diagram of a preferred embodiment of a tuner for use in the present invention;

DESCRIPTION OF THE PREFERRED EMBODIMENTS

Now the preferred embodiments of the present invention will be described in the following by taking an example of a color television receiver of the NTSC system. However, it is pointed out that the present invention can be equally applicable to the color television receivers of any other systems, such as the PAL system, the SECAM system and the like, as is readily understood from the following description.

Figure 5:
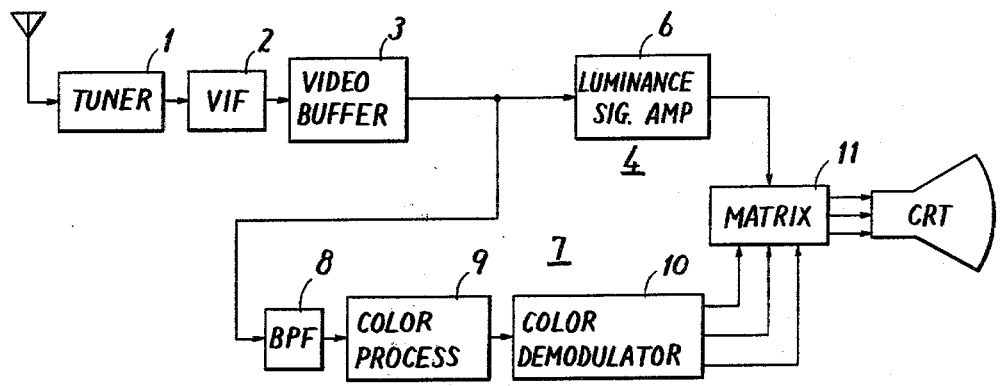
FIG. 5 is a block diagram showing the outline of one embodiment of the present invention.

FIG. 5 is a block diagram showing the outline of a video signal processing circuit employing the present invention. Referring to FIG. 5, in comparison with FIG. 1, the delay line included in the luminance signal circuit 4 in the FIG. 1 diagram has been removed. The present invention was basically made for the purpose of removing a conventional delay line provided in a luminance signal circuit; however, the present invention is also aimed to improve other various characteristics, in addition to removal of the delay line.

Figure 6:
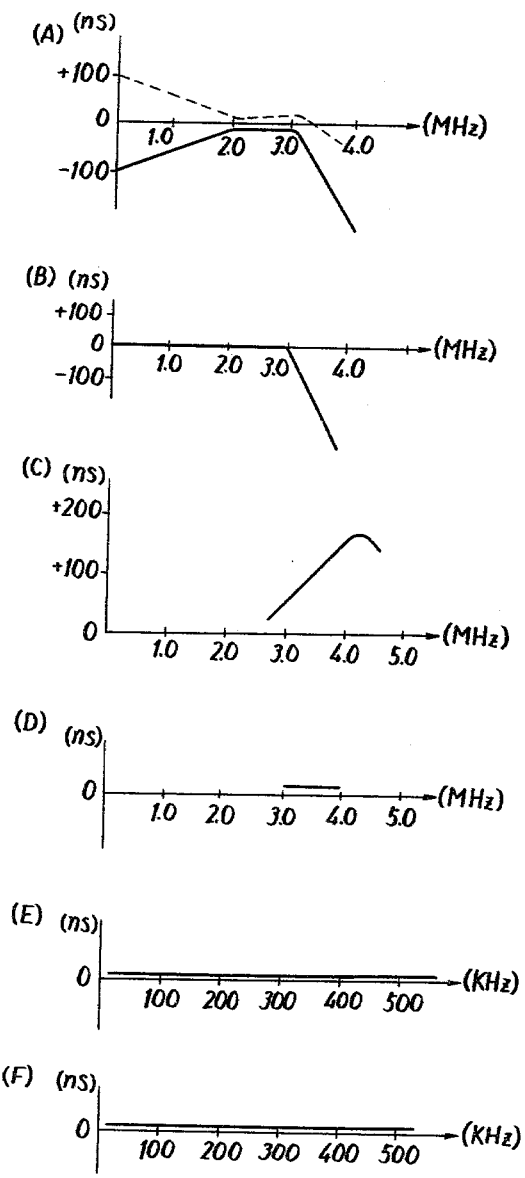
FIG. 6 shows graphs of the delay characteristics at various portions in the FIG. 5 diagram for explaining the present invention.

First referring to FIG. 6, the principle of the present invention will be described. FIG. 6 shows graphs of the delay characteristics at various portions of the FIG. 5 diagram. The delay characteristic at the transmitter end (which is determined in accordance with the standard system) is shown by the solid line in (A) in FIG. 6. The overall delay characteristic from the transmitter end up to the video buffer amplifier 3 is selected or set to be as shown as (B) in FIG. 6. Accordingly, the delay characteristic of the bandpass filter 8 included in the chrominance signal circuit 7 as shown as (C) in FIG. 6 (which is the same as the characteristic as shown (C) in FIG. 2) is offset. To that end, the total delay characteristic from the tuner 1 to the video buffer amplifier 3 in the receiver is selected or set to be as shown by the dotted line in (A) in FIG. 6. Such total delay characteristic can be established by adjusting the phase characteristic (the delay characteristic) of the respective tuning circuits in the tuner 1 and/or the video intermediate frequency circuit 2. In such a case, such phase characteristic or delay characteristic can be implemented with ease by employing a surface acoustic wave device as a filter in the tuner 1 or the video intermediate frequency circuit 2 and by properly designed the same. Such surface acoustic wave device will be described in more detail subsequently.

Figure 3:
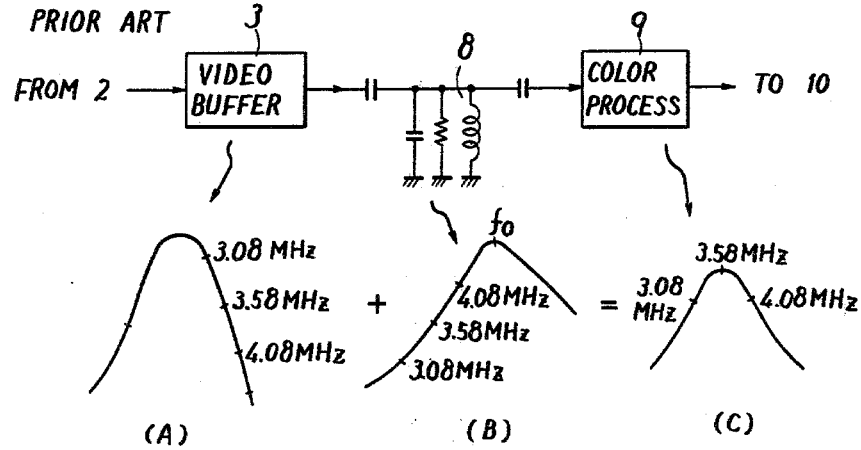
FIG. 3 is a view for explaining the frequency/amplitude characteristic of a bandpass filter.

By selecting the total delay characteristic from the tuner 1 to the video buffer amplifier 3 to be the characteristic shown by the dotted line in (A) in FIG. 6 and thus by setting the overall delay characteristic from the transmitter end to the video buffer amplifier 3 as shown in (B) in FIG. 6, the delay characteristic at the output terminal of the bandpass filter 8 becomes flat with respect to the frequency over the frequency band of the chrominance signal, as shown as (D) in FIG. 6. Meanwhile, the frequency/amplitude characteristic in the frequency band of the chrominance signal at the output terminal of the video buffer amplifier 3 is selected to be as shown as (A) in FIG. 3, as in the conventional case.

On the other hand, the delay characteristic at the output of the bandpass filter 8 becomes flat, whereas the luminance signal obtained from the luminance signal amplifier 6 comes to exhibit a slope in the delay characteristic, as described previously, in the frequency band of 3 to 4 MHz; however, the luminance signal in the above described frequency band is blocked by a filter or a trap circuit for removing the color subcarrier wave component, as described previously with reference to (H) in FIG. 2 and accordingly is very little introduced into the matrix circuit 11. Accordingly, the slope in the delay characteristic in the frequency band of 3 to 4 MHz of the luminance signal exerts very little or no influence upon the picture quality.

Figure 7:
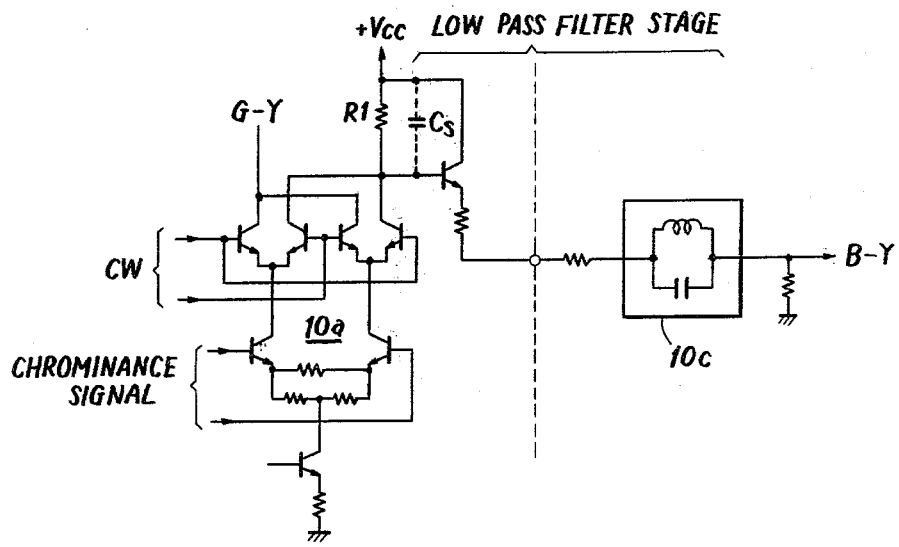
FIG. 7 is a schematic diagram of a preferred embodiment of a color demodulator for use in the present invention.

In the embodiment shown, the delay characteristic in the color demodulator 10 included in the chrominance signal circuit 7 is also made flat with respect to the frequency. FIG. 7 is a schematic diagram of a major portion of the color demodulator 10 for use in such embodiment. The color demodulator 10 also comprises a double balance demodulator 10a, as in the case of the FIG. 4 diagram. Meanwhile, the color demodulator 10 comprising such double balance demodulator 10a is disclosed in, for example, U.S. Pat. No. 4,122,491 issued Oct. 24, 1978 to Yamaguchi et al. The above referenced United States Patent is incorporated herein by referring thereto, whereby a redundant description of such double balance demodulator will be omitted.

Figure 4:
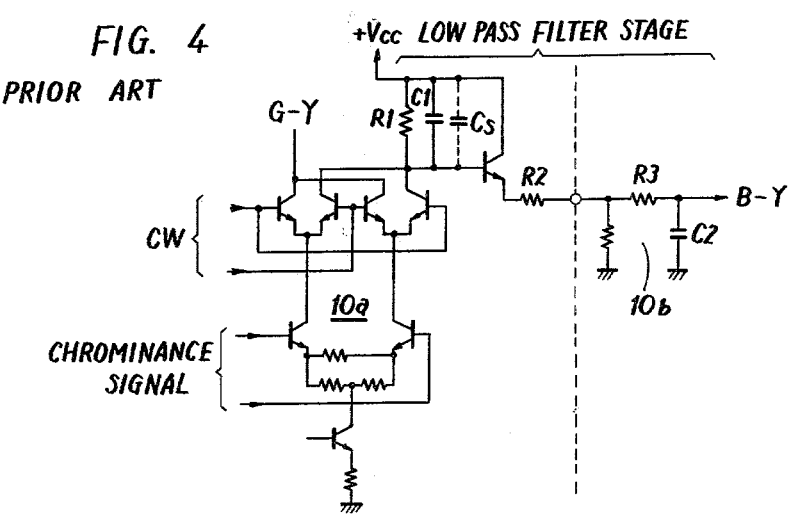
FIG. 4 is a schematic diagram of a major portion of a conventional color demodulator.

The delay characteristic is also exhibited by the color demodulator 10, because the capacitor C1 and the stray capacitance Cs described previously with reference to FIG. 4 are included therein. Therefore, in the embodiment shown, the capacitor C1 (FIG. 4) is removed as shown in FIG. 7. At the same time, the resistance value of the load resistor R1 is selected to be small say 3kΩ as compared with a conventional resistance value say 10kΩ for the purpose of decreasing an influence of the stray capacitance Cs. As a result, a filtering function in the lower frequency region constituted by the load resistor R1 and the stray capacitance Cs is decreased and accordingly the delay characteristic is also improved simultaneously. Thus an influence exerted by the stray capacitance Cs is mitigated. One of the circuit components which largely influence the delay characteristic in the color demodulator 10 is a conventional low pass filter 10b shown in FIG. 4 (which is provided for the purpose of removing the color subcarrier component). Therefore, in the embodiment shown, a parallel resonance circuit 10c is substituted in FIG. 7 for the low pass filter 10b (FIG. 4). The resonance frequency of the parallel resonance circuit 10c is selected to be two times the color subcarrier frequency (i.e. 3.58×2=7.16 MHz). Then the component of the color subcarrier frequency can be attenuated or blocked by means of the parallel resonance circuit 10c. However, since the resonance frequency of the parallel resonance circuit 10c is much different from the frequency range of the color demodulated output, i.e. the color difference signals, such as 0 to 500 kHz, a phase characteristic is substantially flat in the frequency range of such color difference signals. Therefore, the delay characteristic of the color difference signals obtained from the color demodulator 10 becomes substantially flat. Accordingly, employment of the above described resonance circuit 10c and the improvement of the delay characteristic by the load resistor R1 and the stray capacitance Cs makes substantially flat the overall delay characteristic at the low pass filter stage of the color demodulator 10 in the embodiment shown with respect to the frequency as shown as (E) in FIG. 6.

As described in the foregoing, the delay characteristic at the output terminal of the bandpass filter 8 included in the chrominance signal output 7 and the delay characteristic at the output terminal of the color demodulator 10 become flat and as a result the overall delay characteristic from the transmitter end up to the output terminal of the chrominance signal circuit 7, i.e. at the output terminal of the above described low pass filter stage becomes also flat as shown as (F) in FIG. 6. As described previously, by selecting the total delay characteristic from the tuner 1 up to the video buffer amplifier 3 in the receiver to be the characteristic as shown as (A) in FIG. 6, a conventional delay line provided in the luminance signal circuit can be dispensed with. Furthermore, since the delay characteristic of the chrominance signal circuit becomes flat as shown as (F) in FIG. 6, it follows that the phases of the brightness signal and the chrominance signal come to coincide with each other with accuracy from the lower frequency region to the higher frequency region and as a result no color distortion occurs and the picture quality is much improved.

In the foregoing, the most preferred embodiment of the present invention was described. More specifically, in the above described embodiment, the overall delay characteristic from the tuner 1 to the video buffer amplifier 3 is modified, whereby a delay line being included in the luminance signal circuit is removed. At the same time, the delay time difference between the chrominance signal circuit and the luminance signal circuit caused thereby is offset by modifying the total delay characteristic from the tuner 1 to the video buffer amplifier 3, while the delay characteristic of the low pass filter stage included in the color demodulator 10 is improved, whereby the picture quality is improved. However, in the case where only removal of a conventional delay line is intended, such a structure as described in the following may be employed, although slight degradation of the picture quality might be caused because the preshoot, overshoot, ringing or the like.

Figure 8:
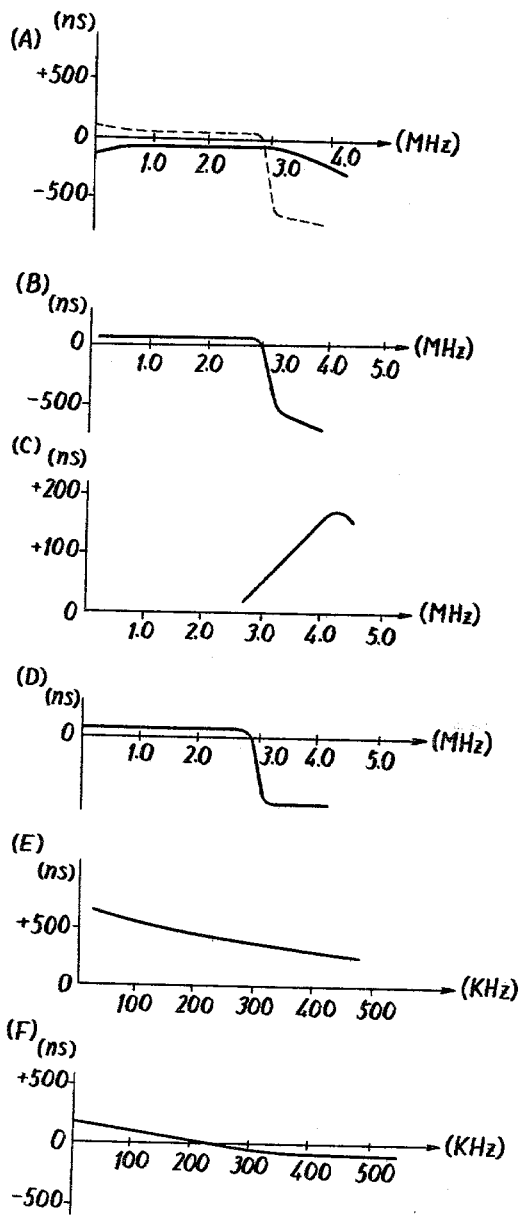
FIG. 8 shows graphs of the waveform characteristics at various portions in the FIG. 5 diagram for explaining another embodiment of the present invention.

FIG. 8 shows graphs of the delay characteristics at various portions corresponding to the FIG. 6 diagram for explaining another embodiment of the present invention. Only for the purpose of removing a conventional delay line, the overall delay characteristic from the transmitter end up to the video buffer amplifier 3 is selected as shown as (B) in FIG. 8, so that the delay characteristic of the bandpass filter 8 shown as (C) in FIG. 8 and the delay characteristic at the low pass filter stage of the color demodulator 10 as shown as (E) in FIG. 8 may be corrected. More specifically, in the embodiment shown, the total delay characteristic from the tuner 1 to the video buffer amplifier 3 is selected or set as shown by the dotted line as (A) in FIG. 8, so that the characteristic may be in the negative direction, i.e. in the advanced phase direction only in the frequency range of say 3 to 4 MHz of the chrominance signal, whereby the overall delay characteristic from the transmitter end to the video buffer amplifier 3 may become the characteristic as shown as (B) in FIG. 8. Meanwhile, even in such a case, by employing a surface acoustic wave device in the tuner 1 and/or the video intermediate frequency circuit 2, as in the case of the previously described embodiment, the phase characteristic or the delay characteristic can be modified as desired with relative ease.

By selecting the total delay characteristic from the tuner 1 up to the video buffer amplifier 3 to be the characteristic as shown by the dotted line in (A) in FIG. 8, the delay characteristic at the output terminal of the bandpass filter 8 included in the chrominance signal circuit 7 becomes as shown as (D) in FIG. 8. Therefore, the delay characteristic at the output terminal of the low pass filter stage of the color demodulator 10 becomes ultimately as shown as (F) in FIG. 8. As seen from a comparison of the characteristic as shown as (F) in FIG. 8 and the characteristic as shown as (F) in FIG. 2, according to the embodiment in discussion, the chrominance signal is not delayed so much with respect to the luminance signal as compared with the previously described embodiment as shown in FIG. 2. Therefore, even in the embodiment in discussion, a delay line can be dispensed with as in the case of the previously described embodiment.

Meanwhile, although in such a case the delay characteristic of the luminance signal from the tuner 1 up to the video buffer amplifier 3 cannot be attained as a predetermined characteristic in the above described frequency region say 3 to 4 MHz of the chrominance signal, degradation of the luminance signal in such frequency region does not become of so much problem inasmuch as the luminance signal in such frequency region is removed by a color subcarrier component removing filter in the luminance signal circuit 4.

Now, based on the above described principle of the present invention, a preferrred embodiment for implementing a specific color television receiver will be described.

FIG. 9 is a block diagram showing the outline of a preferred embodiment of the tuner 1 for use in the present invention. The preferred embodiment shown employs a surface acoustic wave filter as a tuning element in the tuner 1. More specifically, the surface acoustic wave device 101 is constituted of a plurality of surface acoustic wave filters in association with the frequencies being selected or tuned, respectively. For example, a plurality of surface acoustic wave filters are formed in the respective electrode patterns associated with the respective channels such as A, B, C, . . . , respectively. The filters formed in the surface acoustic wave device are used to each serve as a conventional high frequency tuning circuit and an interstage tuning circuit. The filter of each of the channels formed on the substrate of the surface acoustic wave device 101 is selectively switched by means of annexed switches 101a and 101b responsive to a channel selection signal provided from a channel selector, not shown, whereby the channel selecting operation is achieved by the channel selector. The output from the surface acoustic wave device 101, i.e. the color television broadcasting signal as selected by the selecting switch 101b is applied through a high frequency amplifier 102 to a mixer 103. The mixer 103 is also connected to receive a local oscillation signal from a local oscillator 104. The local oscillator 104 also comprises a surface acoustic wave device 105, which constitutes a part of the local oscillator 104 together with an oscillation transistor 106. More specifically, in the embodiment shown, the local oscillator 104 employs an oscillator of a surface acoustic wave type. Although not shown, the surface acoustic wave device 105 also comprises a plurality of filters associated with the respective channels, respectively, so that the filters are selectively switched responsive to a channel selection signal provided to a switch 105a, whereby the corresponding one filter is selected. The local oscillation signal from the local oscillator 104 is applied to the mixer 103 and as a result a video intermediate frequency signal corresponding to the selected television signal is obtained.

Figure 10A:
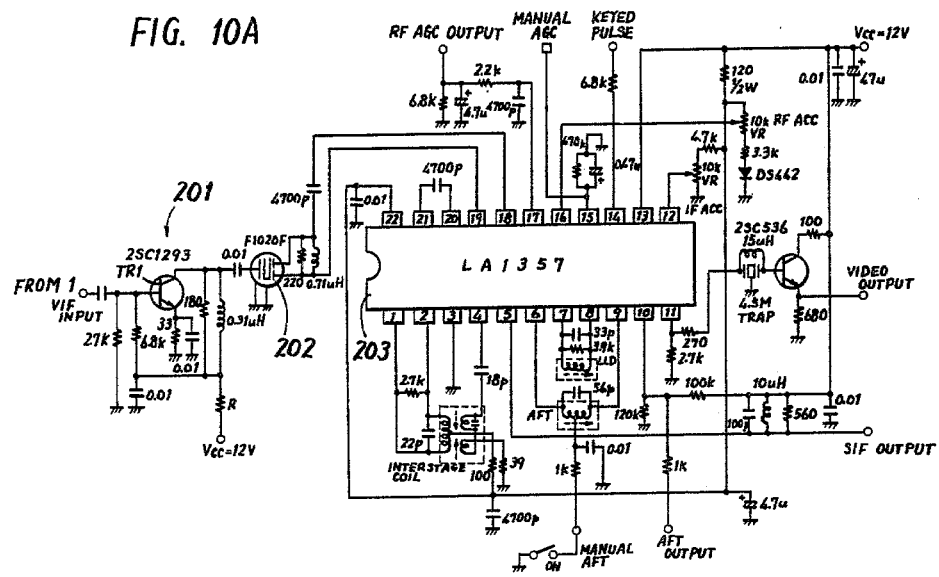
FIG. 10A is a schematic diagram of a preferred embodiment of a video intermediate frequency circuit for use in the present invention.
Figure 10B:
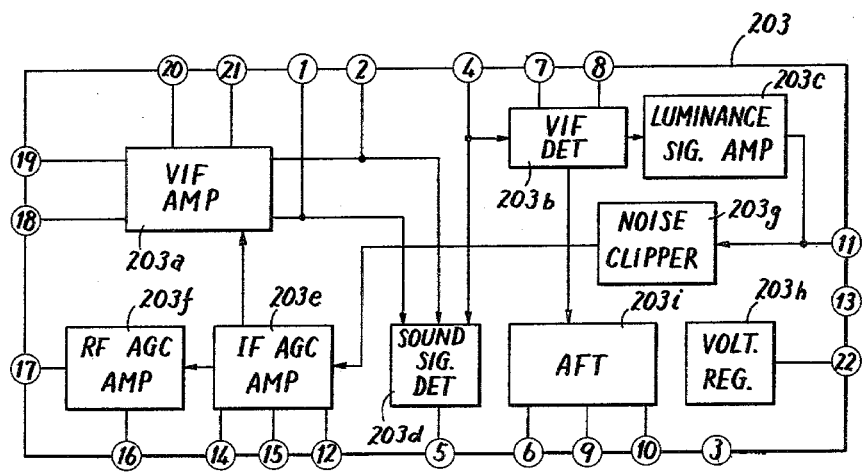
FIG. 10B is a block diagram of the integrated circuit shown in the FIG. 10A.

FIG. 10A is a schematic diagram of the video intermediate frequency circuit 2 employing a surface acoustic wave device. The video intermediate frequency signal obtained from the tuner 1 is applied to a preamplifier 201 comprising a transistor TR1. The preamplifier 201 may be provided only as necessary. The output of the preamplifier 201 is applied to a surface acoustic wave filter 202. The video intermediate frequency signal selected with a predetermined selectivity characteristic by means of the surface acoustic wave filter 202 is applied to an integrated circuit 203. The integrated circuit 203 may be model LA1357 manufactured by Tokyo Sanyo Electric Company Ltd., Japan. The integrated circuit 203 comprises various circuit portions as shown in FIG. 10B.

More specifically, the integrated circuit 203 comprises a video intermediate frequency amplifier 203a connected to receive a video intermediate frequency signal from a surface acoustic wave filter 202 through the terminals ⑱ and ⑲ . The output from the video intermediate frequency amplifier 203a is applied through an interstage coil (shown as in FIG. 10A) externally connected at the terminals ①, ② and ④ to a video intermediate frequency detecting circuit 203b. The output of the video intermediate frequency detecting circuit 203b is withdrawn through a luminance signal amplifier 203c from the terminal ⑪ as a video signal output. The integrated circuit 203 further comprises a sound signal detecting circuit 203d receiving the output from the video intermediate frequency amplifier 203a. The sound signal is withdrawn from the terminal ⑤. The integrated circuit 203 further comprises amplifiers 203e and 203f for generating an automatic gain control voltage. The amplifier 203e is responsive to a keyed pulse provided from the terminal ⑭ and an automatic gain control level control voltage provided from the terminal ⑫ to provide an automatic gain control voltage to the video intermediate frequency amplifier 203a. The amplifier 203f is responsive to the output provided from the amplifier 203e and a high frequency automatic gain control voltage provided from the terminal ⑯ to provide a high frequency automatic gain control output at the terminal ⑰. The integrated circuit 203 further comprises a noise clipper 203g for clipping a noise included in the output from the luminance signal amplifier 203c, a voltage regulator 203h for the voltage of 7 V, and an automatic fine tuning circuit 203i receiving the output of the synchronous detecting circuit 203d constituting the video intermediate frequency detecting circuit. The output of the noise clipper 203g is applied to the previously described intermediate frequency automatic gain control amplifier 203e. The output from the automatic fine tuning circuit 203i is withdrawn from the terminal ⑩ as an automatic fine tuning output. Since such a structure of the integrated circuit 203 is well-known, it is not believed necessary to describe the same in more detail.

Meanwhile, an example of a video intermediate frequency circuit employing a surface acoustic wave device is disclosed in U.S. Pat. No. 3,723,915 issued Mar. 27, 1973 to Adler et al.

Figure 11:
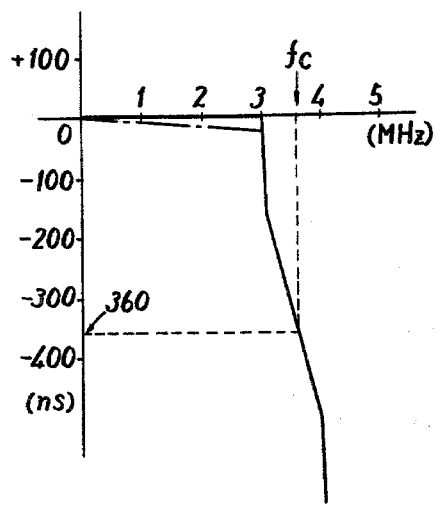
FIGS. 11 and 12 are graphs showing the delay characteristics for explaining in detail a preferred embodiment of the present invention utilizing the group delay characteristic of a surface acoustic wave device as a delay element.

As described previously, for the purpose of removing a delay line which was conventionally required, the overall delay characteric from the transmitter end to the video buffer amplifier 3 is selected such that the delay characteristic of the tuner 1 and/or the video intermediate frequency circuit 2 offsets the delay time difference between the luminance signal circuit 4 and the chrominance signal circuit 7. By doing so, it is possible to make the phases of the output of the luminance signal circuit 4 and the output of the chrominance signal circuit 7 coincide with each other, without employing a conventional delay line. To that end, the relative delay characteristic between the frequency range (say 0 to 3 MHz) of the luminance signal and the frequency range (say approximately 3 to 4 MHz) of the chrominance signal at the output terminal of the video buffer amplifier 3 covering the transmitter end may be set to be the characteristic as shown in FIG. 11. More specifically, the component of the frequency range of the chrominance signal may be selected to be largely advanced (minus in the delay time) with respect to the component of the frequency range of the luminance signal. Referring to FIG. 11, a slope is attained in the delay characteristic of the frequency range of the chrominance signal for the purpose of correcting a slope of the delay characteristic caused by the bandpass filter 8 included in the chrominance signal circuit 7. As described previously, the delay characteristic in the transmitter end, (precompensation) is as shown by the dotted line in FIG. 12. Therefore, a relative delay characteristic between the component of the luminance signal frequency range and the component of the chrominance signal frequency range required between the tuner 1 and the video buffer amplifier 3 shown in FIG. 5 may be set as shown by the solid line in FIG. 12. Such selection of the relative delay characteristic will be more specifically described in the following.

As far as a typical color television receiver of the NTSC system presently used in Japan is concerned, the total delay time in the luminance signal circuit 4 is approximately 190 ns with respect to 0.2 MHz, for example, in the frequency range of the luminance signal and the total delay time in the chrominance signal circuit 7 is approximately 550 ns with respect to 3.58 MHz of the color subcarrier frequency. Accordingly, as far as the color subcarrier frequency (3.58 MHz) is concerned, it is sufficient that the same is advanced at the output terminal of the video buffer amplifier 3 by 360 ns (=550−190 ns) with respect to the component of the luminance signal frequency range. However, the previously described delay characteristic at the transmitter end is 170 ns with respect to the color subcarrier frequency 3.58 MHz in the standard system. Therefore, the phase advance amount for the component of the luminance signal frequency range required between the tuner 1 and the video buffer amplifier 3 with respect to the color subcarrier frequency 3.58 MHz may be 190 ns (=360−170 ns). Similarly, the respective delay times in the chrominance signal circuit 7 with respect to the lower limit frequency say 3 MHz and the upper limit frequency say 4 MHz of the chrominance signal frequency range are evaluated, whereupon the delay times required for the respective frequencies between the tuner 1 and the video buffer amplifier 3 are evaluated. By thus evaluating the delay time required between the tuner 1 and the video buffer amplifier 3 with respect to the respective frequencies, the same can be determined as a delay characteristic as shown by the solid line in FIG. 12. Meanwhile, referring to FIG. 12, a delay is attained or the delay characteristic is made plus for the purpose of offsetting the delay characteristic at the transmitter end in the range of say 0 to 2 MHz of the luminance signal frequency range, as described previously with reference to FIG. 6.

Figure 12:
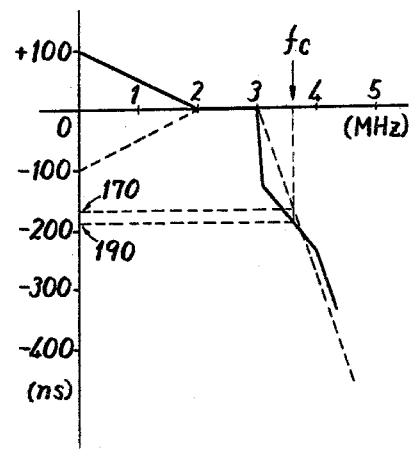

Thus such delay characteristic as shown by the solid line in FIG. 12 may be attained by the tuner 1 and/or the video intermediate frequency circuit 2. Such required delay characteristic can be obtained with ease by using a surface acoustic wave device. More specifically, the group delay characteristic of a surface acoustic wave device used in the tuner 1 in FIG. 9 or the video intermediate frequency circuit 2 in FIG. 10 described previously is selected to be adaptable to such delay characteristic. Meanwhile, it is a matter of course that in such a case the frequency/amplitude characteristic of the respective surface acoustic wave device is determined to satisfy the respective predetermined characteristic.

Figure 13:
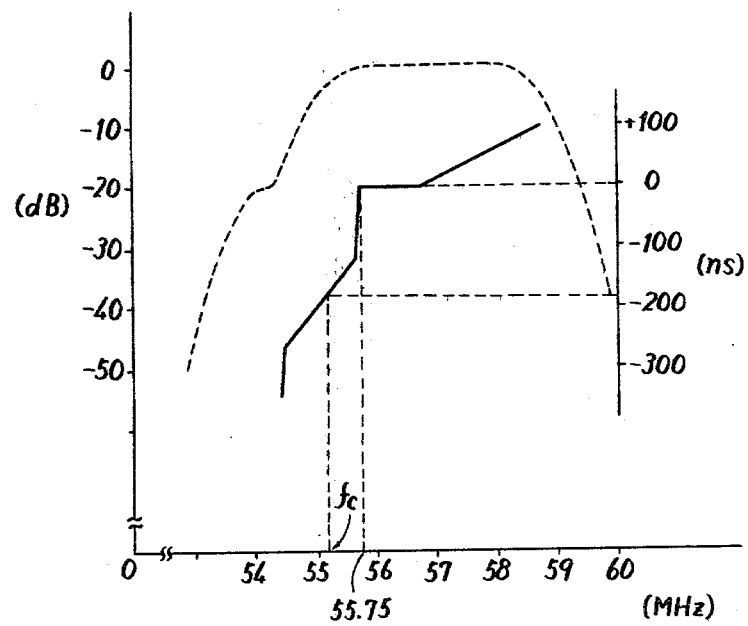
FIG. 13 is a view showing one example of an electrode pattern of a surface acoustic wave device for use in the present invention.

FIG. 13 is a graph showing the characteristic of the surface acoustic wave filter 202 of the FIG. 10 embodiment wherein a surface acoustic wave device is used in the video intermediate frequency circuit 2. Meanwhile, if and when the characteristic of the surface acoustic wave device 202 included in the video intermediate frequency circuit 2 is selected to be the characteristic as shown in FIG. 13, the tuner 1 may be a broad band filter. More specifically, if and when the tuner 1 employs a broad frequency band filter, the delay characteristic of the tuner 1 becomes substantially flat over the frequency range of the luminance signal and the frequency range of the chrominance signal, while the video buffer amplifier 3 is also naturally a broad frequency band and the delay characteristic thereof is also substantially flat and as a result the delay characteristic as shown by the solid line in FIG. 12 may be attained only by the use of the surface acoustic wave device 202 included in the video intermediate frequency circuit 2. In implementing such surface acoustic wave filter, the surface acoustic wave device may be designed by determining the actual advanced phase amount or the delay amount with respect to the previously described frequencies and the frequency/amplitude characteristic required in the video intermediate frequency band as parameters.

As well-known, since the surface acoustic wave filter employs an acoustic wave, the delay time can be determined independently of the central frequency and the frequency band of the filter by adjusting the distance between the input and the output electrodes. Furthermore, as more fully discussed in "Impulse Model Design of Acoustic Surface Wave Filters" by C. S. Hartmann et al (IEEE Transactions on Microwave Theory and Techniques Volume MTT-21 No. 4 1975), the characteristic of a surface acoustic wave filter is associated with a Fourier transformation pair and the comb shape of the surface acoustic wave filter is given as an impulse response series of the Fourier reverse transformation pair. According to "Frequency Analysis, Modulation and Noise" by S. Goldman (McGraw-Hill Book Company Inc., New York, U.S.A. 1948), a relation between the impulse response h(t), the frequency/amplitude characteristic $S(\omega)$ and the frequency/phase characteristic $\phi(\omega)$ may be defined by the following equation:

$$h(t) = \frac{1}{\pi} \int_O^\infty S(\omega) \cos [\omega t + \phi(\omega)]$$

By giving in the frequency/amplitude characteristic $S(\omega)$ of the above described equation the required frequency/amplitude characteristic of the video intermediate frequency circuit and by giving in the frequency/phase characteristic $\phi(\omega)$ the frequency/phase characteristic for attaining the frequency/group delay time characteristic for the above described purpose, a comb shape electrode configuration of a required surface acoustic wave filter can be obtained, whereby a surface acoustic wave filter for use in the present invention can be implemented.

Figure 14:
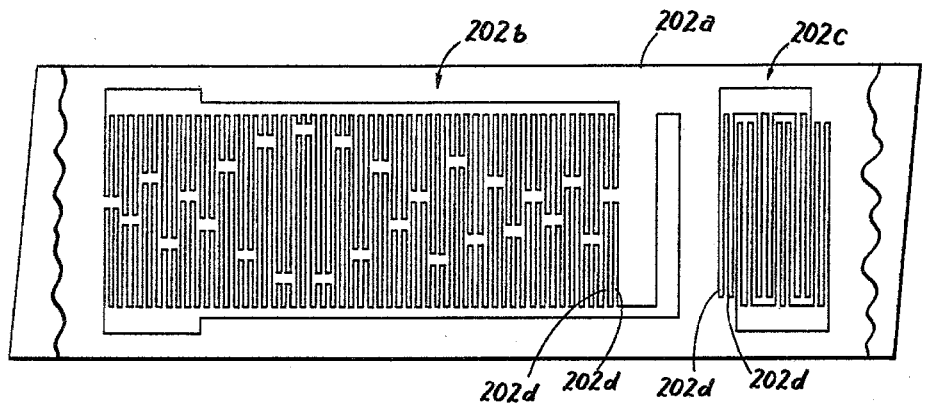
FIGS. 14, 15 and 16 are graphs showing different group delay characteristics of a surface acoustic wave device, respectively.

One example of the electrode pattern of a surface acoustic wave filter thus designed is shown in FIG. 14. The surface acoustic wave filter 202 comprises a substrate 202a made of a piezoelectric material consisting of a single crystal of LiTaO₃, a single crystal of LiNbO₃, or ceramic of PZT, or quartz. Input and output transducers 202b and 202c are formed on the substate 202a. The input and output transducers 202b and 202c are formed in an interdigital electrode having a configuration of split electrode fingers 202d, 202d, ... interdigitated each other. An electrical signal of the video intermediate frequency is excited as a surface acoustic wave by means of the input and output transducers 202b and 202c, while the surface acoustic wave is converted into an electrical signal having a predetermined characteristic. The characteristic of such input and output transducers is determined by the width of the electrode fingers 202d, the disposal pitch, the overlapping lengths where two adjacent electrode fingers are overlapped each other, the number of pairs of the electrode fingers and the like, and as a result a predetermined frequency/amplitude characteristic and group delay characteristic can be attained. Such surface acoustic wave filter itself is also well-known to those skilled in the art, apart from the group delay characteristic unique to the present invention, and therefore it is not believed necessary to describe in more detail such a surface acoustic wave filter itself.

Figure 15:
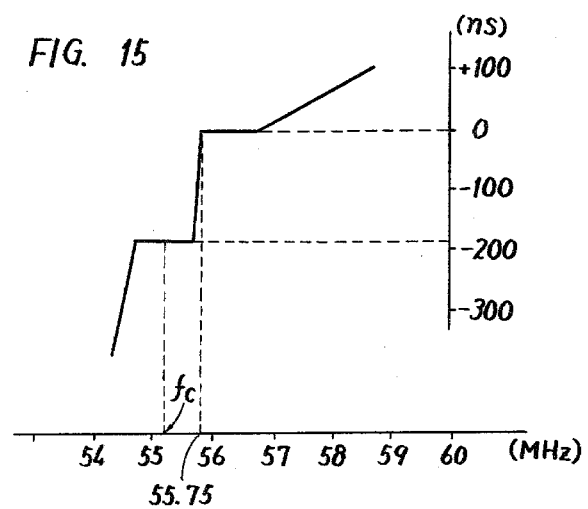

Now referring to FIG. 13, although the advanced phase amount by the surface acoustic wave filter with respect to the color carrier frequency of 55.17 MHz was described as say 190 ns in the previous description, a slight phase difference between the luminance signal and the chrominance signal does not become of so much problem as a matter of practice and particularly in case of a small sized receiver the above described value may not be considered as strict. Incidentally, the inventor made experimentation by selecting the advanced phase amount with respect to the color subcarrier frequency to the range of say 150 ns to 250 ns in a receiver having the previously described specific delay amount of 190 ns. As a result of such experimentation, it was confirmed that the receiver of such selected advanced phase amount provides the picture quality which is by no means inferior to a conventional television receiver having a delay line. Referring again to FIG. 13, in the frequency range of the chrominance signal (say approximately 54.75 to 55.75 MHz), for the purpose of correcting a slope of the delay characteristic with respect to the chrominance signal caused by the above described bandpass filter 8, a slope opposite to such slope is attained by the embodiment. However, if and when a filter having a flat delay characteristic in such frequency range is available as such bandpass filter 8, then the group delay characteristic of the surface acoustic wave filter may also be of a flat characteristic in the chrominance signal frequency range as shown in FIG. 15.

Furthermore, by selecting the starting point for phase advancing the group delay characteristic of the surface acoustic wave device to 55.75 MHz (which corresponds to 3 MHz of the video signal frequency range) corresponding to the lower limit of the chrominance frequency range shown in FIG. 13, then a slope of the delay group characteristic becomes abrupt toward the chrominance signal frequency range. In such a case, designing of a surface acoustic wave device becomes difficult, even if not impossible, and therefore the group delay characteristic thereof may be adapted to start the phase advancement from 56.26 MHz (which corresponds to 2.5 MHz of the video signal frequency range), without causing any particular problem.

Figure 1:
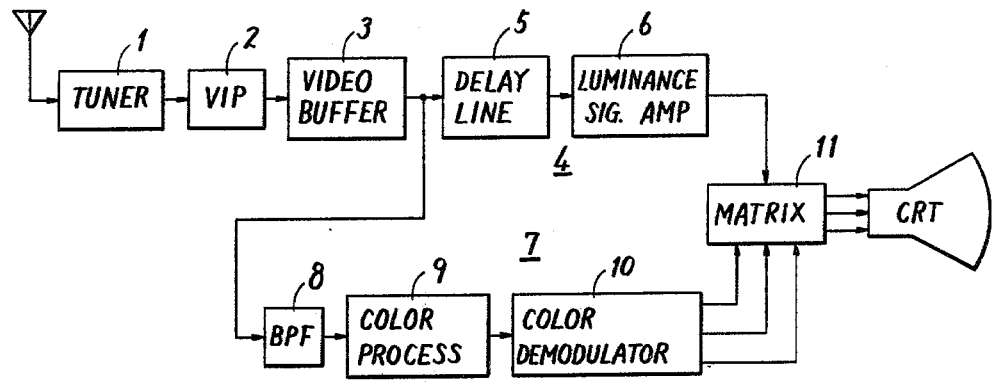
FIG. 1 is a block diagram showing the outline of a conventional video signal circuit in which the present invention can be advantageously employed.
Figure 16:
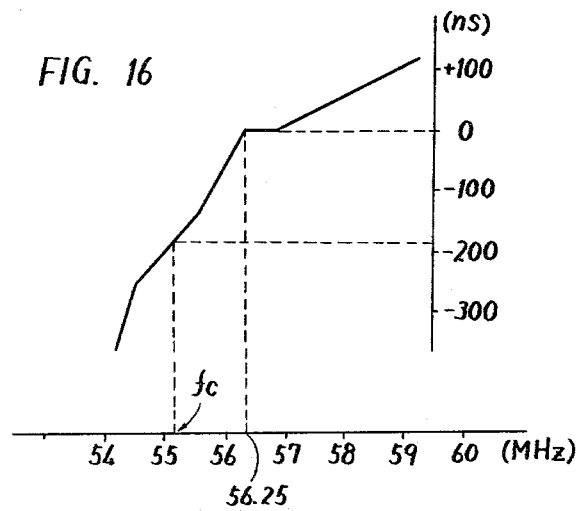

Meanwhile, it has conventionally been practiced that in a television receiver employing a conventional delay line shown in FIG. 1 use is made of a slope of the delay characteristic of the delay line 5 to add a preshoot to a rise portion of the luminance signal, thereby to emphasize a contour of a picture image; however, such can be attained even in case of a color television receiver employing the present invention, as a matter of course. For example, in a television receiver in accordance with the present invention wherein a surface acoustic wave device is utilized in a video intermediate frequency circuit so that the group delay characteristic is selected to exhibit the characteristic shown in FIG. 13, 15 or 16, a characteristic as shown by one dotted line in FIG. 11 may be attained. More specifically, the surface acoustic wave device may be designed such that the phase may be lightly advanced from the lower frequency region to the higher frequency region in the luminance signal frequency range as shown by one dotted line in FIG. 11. By designing the device as described in the foregoing, a preshoot as described previously can be added to emphasize the contour of the picture image.

Meanwhile, the present invention basically eliminates necessity of a conventional delay line 5 (FIG. 1), while the delay characteristic in the tuner 1 and/or the video intermediate frequency circuit 2 is selected or set to compensate the delay time difference between the luminance signal circuit 4 and the chrominance signal circuit 7 in cooperation with the delay characteristic at the transmitter end. Accordingly, in comparison with the prior art, the chrominance signal is more phase advanced. Therefore, it is necessary to advance the phase of extraction of a burst signal in the chrominance signal processing circuit 9.

Figure 17:
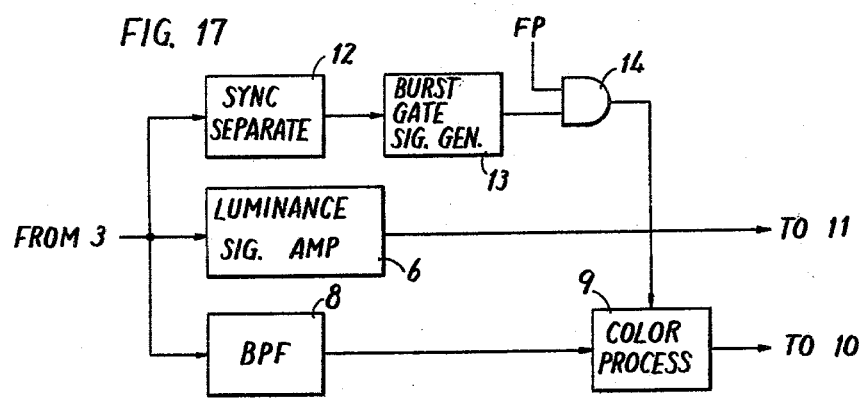
FIG. 17 is a block diagram showing the outline of a major portion of a burst signal circuit.

FIG. 17 is a block diagram showing the outline of the circuit portion associated with extraction of a burst signal. Referring to FIG. 17, a synchronizing separator circuit 12, a burst gate signal generating circuit 13 and an AND gate 14 are provided for the purpose of enabling a burst gate, not shown, in the chrominance signal processing circuit 9. More specifically, in the synchronizing seperator circuit 12, a horizontal synchronizing signal is extracted from the video signal output obtained from the video buffer amplifier 3 and the extracted horizontal synchronizing signal is applied to the burst gate signal generating circuit 13. The burst gate signal generating circuit 13 is responsive to the horizontal synchronizing signal to generate a burst gate signal for enabling extraction of a burst signal in the chrominance signal processing circuit 9 a predetermined time say 5 $\mu$s after the above described horizontal synchronizing signal. The output from the burst gate signal generating circuit 13 is applied to one input of the AND gate 14 and a flyback pulse FP obtained from a flyback circuit, not shown, is applied to the other input of the AND gate 14. Accordingly, a burst gate signal is withdrawn from the AND gate 14 at the timing determined by the output from the burst gate signal generating circuit 13 and the flyback pulse FP, and the said burst gate signal is applied to the chrominance signal processing circuit 9.

Figure 18A:
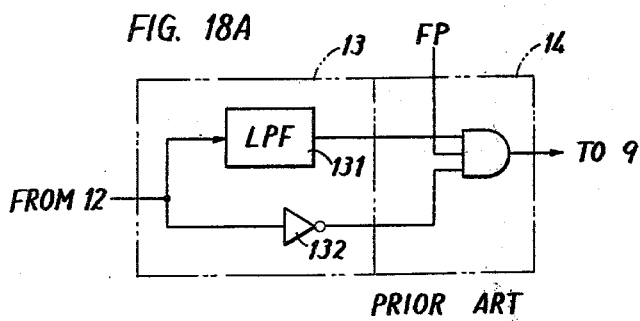
FIG. 18A is a schematic diagram showing one example of a conventional burst gate signal generating circuit.
Figure 18B:
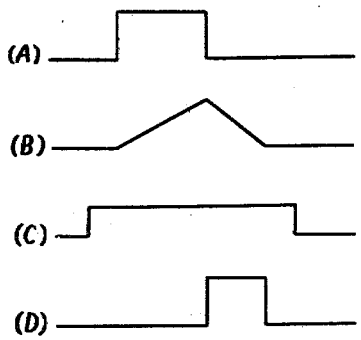
FIG. 18B shows waveforms of signals for explaining an operation thereof.

FIG. 18A shows a block diagram of a conventional structure of the burst gate signal generating circuit 13 and the AND gate 14 and FIG. 18B shows waveforms for explaining an operation of the FIG. 18A diagram. More specifically, the conventional burst gate signal generating circuit 13 comprises an integrating circuit or a low pass filter 131 for a horizontal synchronizing signal. The integration circuit or the low pass filter 131 is responsive to a horizontal synchronizing signal shown as (A) in FIG. 18B to integrate the same as shown as (B) in FIG. 18B. On the other hand, the horizontal synchronizing signal is inverted by the inverter 132. The output of the low pass filter 131 and the output of the inverter and the flyback pulse FP as shown as (C) in FIG. 18B are applied to the AND gate 14. Therefore, a burst gate signal as shown as (D) in FIG. 18B is withdrawn from the AND gate 14.

Figure 19A:
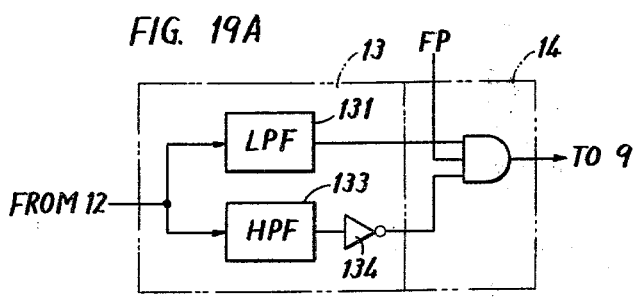
FIG. 19A is a schematic diagram showing one example of a burst gate signal generating circuit for use in the present invention.
Figure 19B:
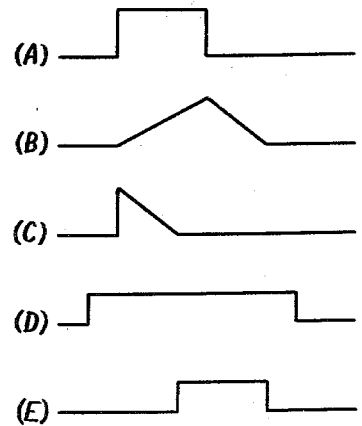
FIG. 19B shows waveforms of signals for explaining an operation thereof.

FIG. 19A is a block diagram of the burst gate signal generating circuit 13 which has been improved to be adaptable to the phase advancement of the chrominance signal caused by the present invention and FIG. 19B shows waveforms for explaining an operation of the FIG. 19A diagram. More specifically, the burst gate signal generating circuit 13 for use in the inventive receiver comprises a similar low pass filter 131. The improved burst gate signal generating circuit 13 also comprises a differentiation circuit or a high pass filter 133. The differentiation circuit 133 serves to differentiate the leading edge or the rise of the horizontal synchronizing signal as shown as (A) in FIG. 19B, thereby to provide a differentiated output as shown as (C) in FIG. 19B. The differentiated output from the high pass filter 133 is inverted by the inverter 134. The output of the low pass filter 131 as shown as (B) in FIG. 19B and the flyback pulse FP as shown as (D) in FIG. 19B and the output from the previously described inverter 134 are all applied to the AND gate 14. Therefore, a burst gate signal as shown as (E) in FIG. 19B is obtained from the AND gate 14. In comparison of the FIG. 19B waveforms with the previously described FIG. 18B waveforms, it would be appreciated that the burst gate signal applied to the chrominance signal processing circuit 9 from the AND gate 14 has been phase advanced in the FIG. 19A embodiment by say 360 ns as compared with the burst gate signal in case of the FIG. 18A diagram. Such improvement can attain advancement of the phase for extraction of a burst signal which is advanced in phase of the chrominance signal as compared with a conventional one.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A color television receiver for receiving a color television signal transmitted from a transmitter end comprising:
    tuner means for converting said received color television signal into a video intermediate frequency signal;
    video intermediate frequency circuit means for receiving said intermediate frequency signal from said tuner means for converting said video intermediate frequency signal to a video signal, said video intermediate frequency circuit means including surface acoustic wave filter means for imparting a predetermined amplitude characteristic and a group delay characteristic to said video intermediate frequency signal and means for amplifying and detecting said video intermediate frequency signal obtained from said surface acoustic wave filter means;
    luminance signal circuit means coupled to said video intermediate frequency circuit means for separating a luminance signal from said video signal obtained from said means for amplifying and detecting said video intermediate frequency signal and including luminance signal amplifying means for amplifying said luminance signal;
    chrominance signal circuit means coupled to said video intermediate frequency circuit means for separating a chrominance signal from said video signal obtained from said means for amplifying and detecting said video intermediate frequency signal and including bandpass filter means for separating a chrominance signal from said video signal, and picture signal processing means for demodulating said chrominance signal obtained from said bandpass filter means for converting the same into color difference signals; and
    color display means responsive to said luminance signal obtained from said luminance signal amplifying means and said color difference signals obtained from said chrominance signal processing means for displaying a color picture;
    wherein said surface acoustic wave filter means provides an overall delay characteristic from the transmitter end to the input of said luminance signal circuit means which offsets the time difference between the delay time period of said luminance signal in said luminance signal circuit means and the delay time period of said chrominance signal in said chrominance signal circuit means and wherein said surface acoustic wave filter means provides an overall delay characteristic which compensates the slope of the delay characteristic in said bandpass filter means such that the delay characteristic with respect to said chrominance signal at the output end of said bandpass filter means is flat.

2. A color television receiver in accordance with claim 1 wherein:
    said picture signal circuit means comprises color demodulating means responsive to said chrominance signal for providing said color difference signals,
    said color demodulating means includes:
        delay means having a predetermined delay characteristic for delaying the signal therein with said delay characteristic, and
        flattening means for flattening said delay characteristic of said delay means with respect to frequency.

3. A color television receiver in accordance with claim 1 wherein:
    said group delay characteristic of said surface acoustic wave means is selected to exhibit a slope in the vicinity of a subcarrier frequency of said chrominance signal wherein the delay characteristic at the output of said bandpass filter is flattened.

4. A color television receiver in accordance with claim 1, wherein
    said group delay characteristic of said surface acoustic wave means is selected such that said overall delay characteristic may be slightly phase advanced from the lower frequency region to the higher frequency region in the frequency range of said luminance signal.

5. A color television receiver in accordance with claim 1 wherein said color television signal comprises a vertical synchronizing signal, a horizontal synchronizing signal, a luminance signal, a chrominance signal modulated on a color subcarrier, and a burst signal serving as a reference signal of said color subcarrier signal, said burst signal having a predetermined phase relation with respect to said horizontal synchronizing signal, said television receiver further comprising:
    burst signal extracting circuit means for extracting said burst signal from said color television signal,
    horizontal synchronizing signal separating means for separating said horizontal synchronizing signal from said color television signal,
    extraction enabling means responsive to said horizontal synchronizing signal for enabling said burst signal extracting circuit means, and
    adapting means for adapting said extraction enabling means in accordance with the group delay characteristic of said surface acoustic wave filter means.

6. A color television receiver as set forth in claim 1 wherein said picture signal processing means includes a demodulator means and low pass filter means coupled to the output of said demodulator means, for flattening the delay characteristics of said demodulator means.

* * * * *